United States Patent
Song et al.

(10) Patent No.: US 7,636,679 B2
(45) Date of Patent: Dec. 22, 2009

(54) AUTOMATED REMITTANCE NETWORK

(76) Inventors: Yuh-shen Song, 19848 Turtle Springs Way, Northridge, CA (US) 91326; Catherine Lew, 19848 Turtle Springs Way, Northridge, CA (US) 91326; Alexander Song, 19848 Turtle Springs Way, Northridge, CA (US) 91326; Victoria Song, 19848 Turtle Springs Way, Northridge, CA (US) 91326

(*) Notice: Subject to any disclaimer, the term of this patent is extended or adjusted under 35 U.S.C. 154(b) by 549 days.

(21) Appl. No.: 11/318,070

(22) Filed: Dec. 22, 2005

(65) Prior Publication Data
US 2006/0248018 A1 Nov. 2, 2006

Related U.S. Application Data

(60) Provisional application No. 60/640,859, filed on Jan. 3, 2005.

(51) Int. Cl.
*G06Q 99/00* (2006.01)
(52) U.S. Cl. .................... 705/35; 705/39; 705/43; 713/187
(58) Field of Classification Search .............. 705/39, 705/43; 713/187, 155
See application file for complete search history.

(56) References Cited
U.S. PATENT DOCUMENTS

| | | | |
|---|---|---|---|
| 7,356,505 B2 * | 4/2008 | March | 705/39 |
| 2002/0016763 A1 * | 2/2002 | March | 705/39 |
| 2003/0046224 A1 | 3/2003 | Mutjaba | |
| 2003/0070070 A1 * | 4/2003 | Yeager et al. | 713/157 |
| 2003/0070080 A1 * | 4/2003 | Rosen | 713/187 |
| 2003/0080185 A1 | 5/2003 | Werther | |
| 2003/0140004 A1 | 7/2003 | O'Leary et al. | |
| 2004/0139000 A1 | 7/2004 | Amos | |

OTHER PUBLICATIONS

David Galland, Connecting ATMs to the web, Nov. 2000, Credit Card Management, v 13, n8, p. 16-20.*

* cited by examiner

*Primary Examiner*—Mary Cheung
*Assistant Examiner*—Behrang Badii
(74) *Attorney, Agent, or Firm*—Fulbright & Jaworski LLP (57) ABSTRACT

A computerized network empowers senders to transfer funds and recipients to receive funds at any time anywhere over the world through user-accessible terminals such as ATM terminals, check-cashing kiosks, supermarket checkout stands, etc. There is no need for either the sender or the recipient to open an account with any financial institution; provided they each use an official identification document to complete the transaction. Furthermore, the disclosed network collects and verifies senders' and recipients' identification information in accordance with the anti-money laundering, anti-terrorist financing, and anti-fraud regulatory requirements, such as the Bank Secrecy Act and the USA PATRIOT Act in the United States and any equivalent laws in other countries.

26 Claims, 5 Drawing Sheets

AUTOMATED REMITTANCE NETWORK

This application claims priority of U.S. provisional patent application No. 60/640,859 filed on Jan. 3, 2005, which is hereby incorporated by reference in its entirety.

FIELD OF INVENTION

The present invention relates generally to conducting remittance transactions through networked user-accessible terminals. More specifically, the present invention provides a method and apparatus to effect a computerized transfer of funds from a sender at a first terminal, to a recipient at a second terminal possibly in another country or region, while providing any involved financial institutions with verified identification of both the sender and the recipient.

BACKGROUND OF THE INVENTION

People have many reasons to send money from one location to another. For example, as a result of globalization, people often work at a place far away from home, possibly even in a different country. They often have to send money back to their hometowns in order to support their families or relatives.

The traditional approach of sending money is to use a wire transfer, which requires the recipient to have a bank account. Unfortunately, banking systems are not popular with the general population in many parts of the world and thus many prospective recipients do not have any bank account.

To meet this huge market need, Western Union and many other financial institutions have established branches and agents all over the world. The sender gives money to one of the branches or agents in the sender's area, the recipient will receive money from one of the branches or agents in the recipient's area after a proper identification process. Billions of dollars are moving around the world this way every year.

The cost of doing this business is very high because it is a labor intensive process. Most countries have imposed anti-money laundering, anti-terrorist financing, and anti-fraud obligations upon financial institutions. These financial institutions have to, for example, (1) verify and record the sender's and recipient's identification information, (2) check the sender and recipient against the "blacklists" published by various governments before completing the transaction, and (3) detect any suspicious activity and report it to the government agencies.

These branches and agents of financial institutions are dependent on manual processing to complete the transaction and to fulfill the anti-money laundering, anti-terrorist financing, and anti-fraud requirements imposed by the governments. Furthermore, the branches and agents of the financial institutions are not available anywhere at any time. A sender or a recipient may have to travel a long distance to complete the transaction during the business hours. In case of emergency, there is not much that the sender or the recipient can do to speed up the process.

Governments worldwide are requiring financial institutions to verify and collect at least certain text-based identification information associated with each of the parties to financial transactions in order to enforce anti-money laundering, anti-terrorist financing, and anti-fraud law.

There is thus a need for an automated remittance transaction process which can be automatically performed by user-accessible terminals, 24 hours a day, 7 days a week, and which can be made available almost anywhere in the world.

It has been proposed to conduct remote transactions through ATM terminals using a physical "convenience card" which has been purchased from a vending machine. Such a "convenience card" may then be used to open an account with a sponsoring financial institution before conducting transactions based on this card; however, the "convenience card" does not necessarily identify who the owner of the newly opened account really is; moreover, once the account has been opened, that same "convenience card" can be stolen by or otherwise come into the possession of a criminal or terrorist who can then use the card to send money all over the world to another criminal or terrorist.

With modern technologies, government authorities can store a great deal of machine-readable personal identification information within a person's official identification document such as passport, driver's license, etc. For example, the stored identification information may include biometrical information such as a fingerprint, an iris pattern, a picture, etc., that uniquely identifies a particular individual.

In addition, those same government authorities can store conventional text-based identification information associated with that same individual such as the name, date of birth, identification number, social security number and/or address within the same official identification document, in a manner that assures that the stored text-based information is properly associated with the same individual as the stored biometrical information.

In this document, the terminology "network" or "networks" generally refers to a communication network or networks, which can be wireless or wired, private or public, or a combination of them, and includes the well-known Internet.

In this document, the terminology "computer system" generally refers to either one computer or a group of computers, which may work alone or work together to accomplish the purposes of the system.

In this document, the terminology "computer network" generally refers to either one network or a group of connected networks, which may work alone or work together to accomplish the purposes of the network.

In this document, a "bank" or "financial institution" is generally referred to as a "financial service provider", which encompasses either a bank or a non-bank where financial services are provided.

In this document, a "bank account" or "financial account" is generally referred to as an "account in a financial institution", and encompasses accounts in either a bank or a non-bank where financial transactions are conducted by means of payment instruments such as cash, checks, credit cards, debit cards, monetary instruments, electronic fund transfers, etc.

In this document, the terminology "terminal" or "kiosk" generally refers to a piece of equipment which interfaces a user with a computer network, so that the user may interact with computer systems and other equipment connected to the computer network.

In this document, the terminology "official identification document" generally refers to a passport, a driver's license, an identity card, a certificate of legal status, and other official documents and information bearing instruments that identify a designated individual by certain verifiable characteristics, that are issued or certified by a consulate, embassy, government agency, or other governmental authority, and that are protected against unauthorized copying or alteration by the responsible government. In particular, such "official identification documents" can be formed from various materials and can embed the identification information in various formats, including printed on paper, embossed on a plastic card, written on a magnetic medium, programmed into an electronic device, stored in a memory chip, and combinations thereof. The "identification information" may include, but is not necessarily limited to, names, numbers, signatures, addresses, passwords, personal identification numbers, photographs, fingerprints, iris scans, physical descriptions, and other biometric information.

SUMMARY OF THE INVENTION

One objective of the present invention is to automate the process of remittance transactions using networked terminals (which in certain embodiments may be located anywhere in the world). Instead of going to financial institutions to conduct remittance transactions, senders and recipients can conduct these transactions at any participating user-accessible terminals, such as ATM terminal, check-cashing kiosks, supermarket checkout stands, coin exchange machine, parking lot payment kiosks, gas station payment kiosks, etc.

Another objective is to remove the traditional need for senders and recipients to open an account in any financial institution while at the same time assuring compliance with any applicable anti-money laundering, anti-terrorist financing and anti-fraud requirements imposed by governments all over the world.

By reading the embedded information from an official identification document, a user-accessible terminal can verify the true identity of a person. For example, a user-accessible terminal can directly read the fingerprint information of a person. If the scanned fingerprint of a person matches the fingerprint information embedded within an official identification document, this person must be the official owner of this official identification document. As a result, the text-based identification information embedded within the official identification document such as name, date of birth, address, social security number, etc. has been verified and can be used as an authentic token for the identity of that same person.

In one embodiment of the present invention, after authenticating the true identity of a sender, a user-accessible terminal may prompt the sender to deposit funds into Automated Remittance Network ("ARN") for effecting a remittance transaction by means of cash, credit card, debit card, stored-value card, or a direct transfer from one of sender's financial accounts. The user-accessible terminal may then prompt the sender to enter at least minimal identification information of the recipient. In addition, a unique Transaction Identification Number ("TIN") may be issued by the ARN computer system to identify this transaction. The TIN, the transactional details, and the sender's and the recipient's identification information are preferably stored securely within a transactional database of the ARN computer system. The ARN computer system preferably also performs anti-money laundering, anti-terrorist financing, and anti-fraud measures according to the laws of the local governments worldwide.

In some embodiments, the sender can give the TIN to the recipient by means of telephonic, e-mail or other communication methods. To leverage on the existing infrastructure, a user-accessible terminal can be integrated as part of an ATM terminal, a check-cashing kiosk, a supermarket checkout stand, parking lot payment kiosk, gas station payment kiosk, coin exchange machine, or other type of money-transactional terminals. The ARN can be integrated with the existing ATM network, credit card or debit card network, or other type of private or public network having a level of security suitable for processing financial transactions. As a result, the recipient can go to any participating ATM terminal, check-cashing kiosk, supermarket checkout stand, parking lot payment kiosk, gas station payment kiosk, coin exchange machine, or other money-transactional terminals to receive funds based on the commercial arrangements between the ARN and the owners of these networks and/or of the connected user-accessible terminals.

After authenticating the identity of a claimant using the embedded information of the claimant's official identification document, a second user-accessible terminal preferably prompts the claimant to enter the previously assigned TIN. Based on this unique TIN, the ARN computer system may then search its database and locate the transactional details and the recipient's identification information entered by the sender. If the intended recipient's identification information, which has been entered by the sender into the ARN, matches the claimant's embedded identification information, which is stored within the claimant's official identification document, the identity of both the sender and the recipient have been properly authenticated and the user-accessible terminal may then issue the payment to the recipient by means of cash, stored-value card, or a direct transfer to the recipient's credit card, debit card, or other account.

Some embodiments can be used by a group of financial institutions. A common computer system and transactional database may handle all the remittance transactions for these financial institutions by sharing the same network of user-accessible terminals. Alternatively, each financial institution may have its own computer system and transactional database to conduct all the remittance transactions originated from those user-accessible terminals, which are managed by said financial institution.

In certain embodiments, by using a TIN that uniquely identifies the financial institution or transaction network that has accepted the funds from the sender, a network switch can readily route a recipient's request for payment to that particular financial institution or transaction network to complete the remittance transaction.

BRIEF DESCRIPTION OF THE FIGURES

FIG. 2 (comprising FIG. 2A, FIG. 2B, FIG. 2C and FIG. 2D) is a set of flow charts indicating how the system and network shown in FIG. 1 automates the remittance transactions.

DETAILED DESCRIPTION OF CERTAIN PREFERRED EMBODIMENTS AND COMBINATIONS OF EMBODIMENTS

Although we contemplate that the present invention will in practice be used in many different environments and will be manifested in numerous embodiments, we will describe in detail only a few exemplary presently preferred embodiments of the present invention and certain exemplary combinations of those embodiments.

The Automated Remittance Network ("ARN") is established on a computer network, which may preferably connect many user-accessible terminals, such as ATM terminals, check-cashing kiosks, supermarket checkout stands, coin-exchange kiosk, parking lot payment kiosk, gas station payment kiosk, and other money-transactional terminals. An included ARN computer system is preferably provided for processing the transactions, controlling the data exchange, keeping the records, and managing the activities occurring on the ARN.

When a sender intends to transfer funds, the ARN authenticates his/her identity in order to comply with the requirements of any relevant anti-money laundering, anti-terrorist financing, and anti-fraud set by the governments.

In one embodiment of the present invention, the user-accessible terminal reads the embedded identification information of the sender's official identification document such as passport, driver's license, state-issued official identification document, etc. The embedded information may include text-based information such as name, address, date of birth, ID number, ID expiration date, password, and tax ID, and digitized image-based information such as fingerprint, voice pattern, iris pattern, and facial pattern, etc.

In addition, the user-accessible terminal scans or otherwise obtains directly from the sender, digitized personal identification image-based information such as a fingerprint, a voice pattern, an iris pattern, a facial pattern, etc.

The user-accessible terminal authenticates the sender's identity by comparing the scanned personal information with the stored identification information embedded within the official identification document. For example, if the fingerprint of the sender matches the fingerprint information embedded within the official identification document, the sender must be the official owner of the official identification document. Consequently, the user-accessible terminal can obtain the sender's verified name, address, date of birth, ID number, ID expiration date, and any other required information from the sender's official identification document and send that information to the ARN computer system.

In another embodiment of the present invention, a human operator interfaces with the sender and uses a computer terminal to perform an equivalent function, which the user-accessible terminal would perform as described above.

After thus verifying the identity of the sender, the user-accessible terminal will prompt the sender to enter at lest certain minimal recipient identification information such as legal name, last six digits of the official identification document number, date of birth, etc. Then, the sender can deposit funds into the user-accessible terminal.

In one embodiment of the present invention, the sender deposits cash into the user-accessible terminal. In another embodiment of the present invention, the sender deposits funds by means of credit card, debit card, stored-value card, or other financial instruments. In an alternative embodiment of the present invention, the sender gives instructions to transfer funds from one of his/her financial accounts to the user-accessible terminal.

Once the funds have been received, the sender's user-accessible terminal will notify the ARN computer system, which will issue a TIN for the sender to keep as his/her record. At the same time, the computer system of ARN stores the TIN, transactional details, the sender's identification information and the sender-supplied recipient identification information into a database. The sender can then inform the recipient of the TIN by any conventional means (such as mail, telephone, etc).

In one embodiment of the present invention, once in possession of the TIN, the recipient can go to any participating user-accessible terminal, which connects to ARN. The user-accessible terminal reads the embedded identification information of the recipient's official identification document, such as passport, driver's license, state-issued ID, etc. After authenticating the identity of the recipient, the user-accessible terminal prompts the recipient to enter the TIN, which is used to identify the transaction. The authenticated identification information and the TIN are then sent to the computer system of ARN.

The ARN computer system uses the TIN to locate the record, from which the sender's identification information, the sender-supplied recipient identification information, the transactional details and other relevant information may be extracted.

The ARN computer system then verifies whether the extracted recipient identification information that had been entered by the sender matches the authenticated official identification information that has been read from the recipient's official identification document.

If the verification is successful, the computer system of ARN informs the user-accessible terminal to issue the payment to the recipient as instructed by the sender. If the verification fails, the computer system of ARN informs the user-accessible terminal to reject the transaction.

In one embodiment, the payment is issued in the form of cash. In another embodiment of the present invention, the payment is issued by means of a stored-value card. In yet another alternative embodiment, the payment is issued by transferring funds into one of the recipient's financial accounts or by transferring funds into the recipient's credit card or debit card accounts.

In one embodiment, a computer system and database are used by a single organization to perform all the transactions and to direct all the remittance activities for all the user-accessible terminals of the ARN. In another embodiment of the present invention, each participating financial institution uses a computer system and database to perform all the transactions and direct all the remittance activities for those user-accessible terminals which are managed by the financial institution.

The final settlement will be completed between the financial institution, which has accepted funds from the sender, and the financial institution, which has delivered the funds to the recipient, according to the convention of the financial industry. Since the ARN computer system in either embodiment contains the detail information of both sender and recipient, it can perform anti-money laundering, anti-terrorist financing, and anti-fraud procedure as required by the government.

In one embodiment of the present invention, the ARN is integrated with the existing ATM network. In another embodiment of the present invention, the ARN is integrated with the existing credit card or debit card network. In an alternative embodiment of the present invention, the ARN is integrated with the existing Automatic Clearing House ("ACH") network. In another alternative embodiment of the present invention, the ARN is integrated with other real-time or non-real time networks.

In some presently preferred embodiments, the TIN may incorporate the identification information of a financial institution holding the funds from the sender. An included ARN network switch can then use that incorporated financial institution identification information to direct the recipient's request of payment to the involved financial institution, to complete the remittance transaction.

As contemplated in the described embodiments, one of the possible combinations of the preferred embodiments is given below as an example. The Computer System 300 of the ARN enables the sender 100 to send funds to a recipient 200 through ATM terminals 150 and 250, respectively, which connects to a network 400 as shown in FIG. 1.

Figure 1:
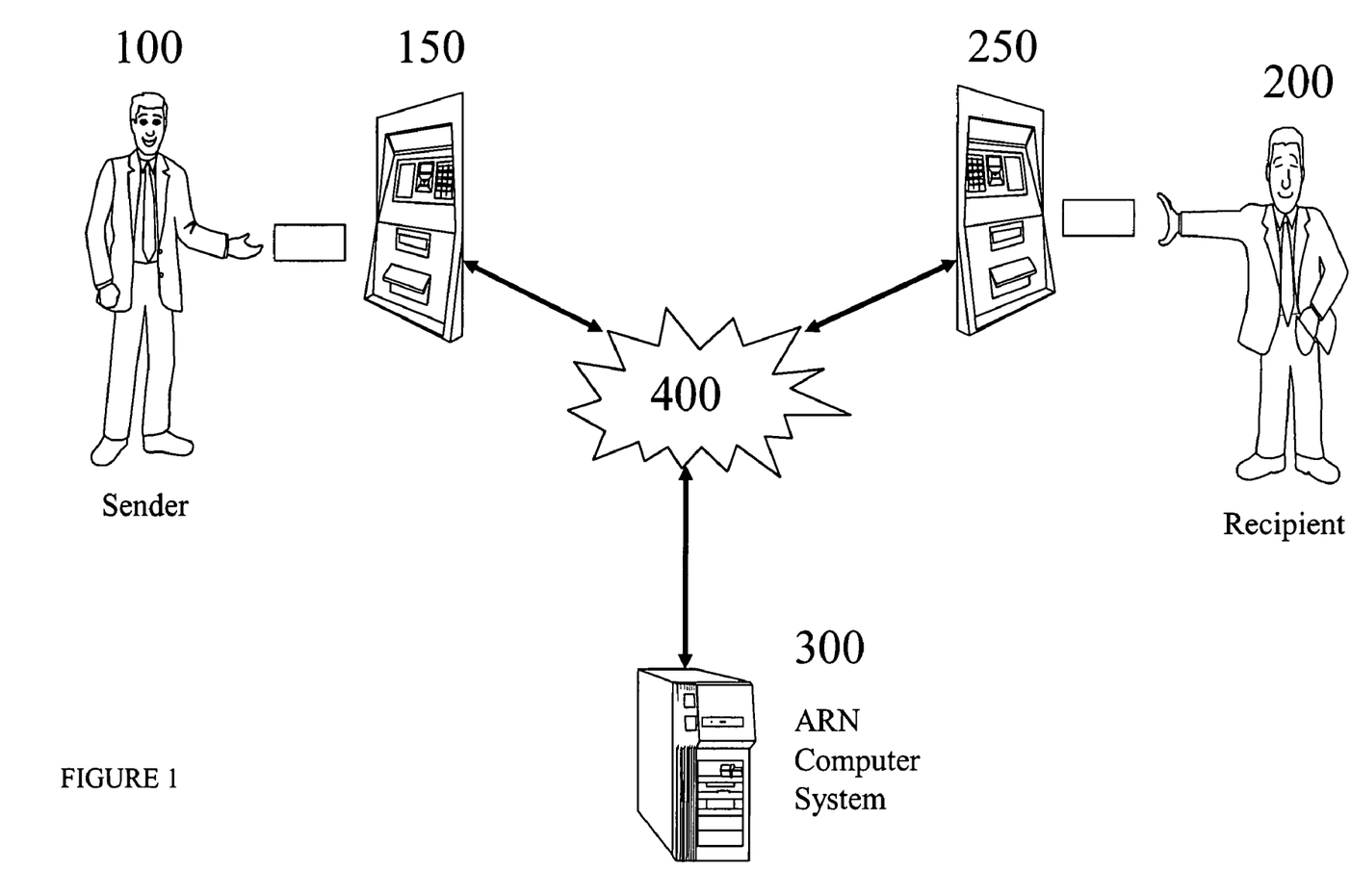
FIG. 1 illustrates the system and network diagram of an exemplary Automated Remittance Network ("ARN"), which enables a sender from anywhere over the world to send money to a recipient anywhere over the world at any time.
Figure 2A:
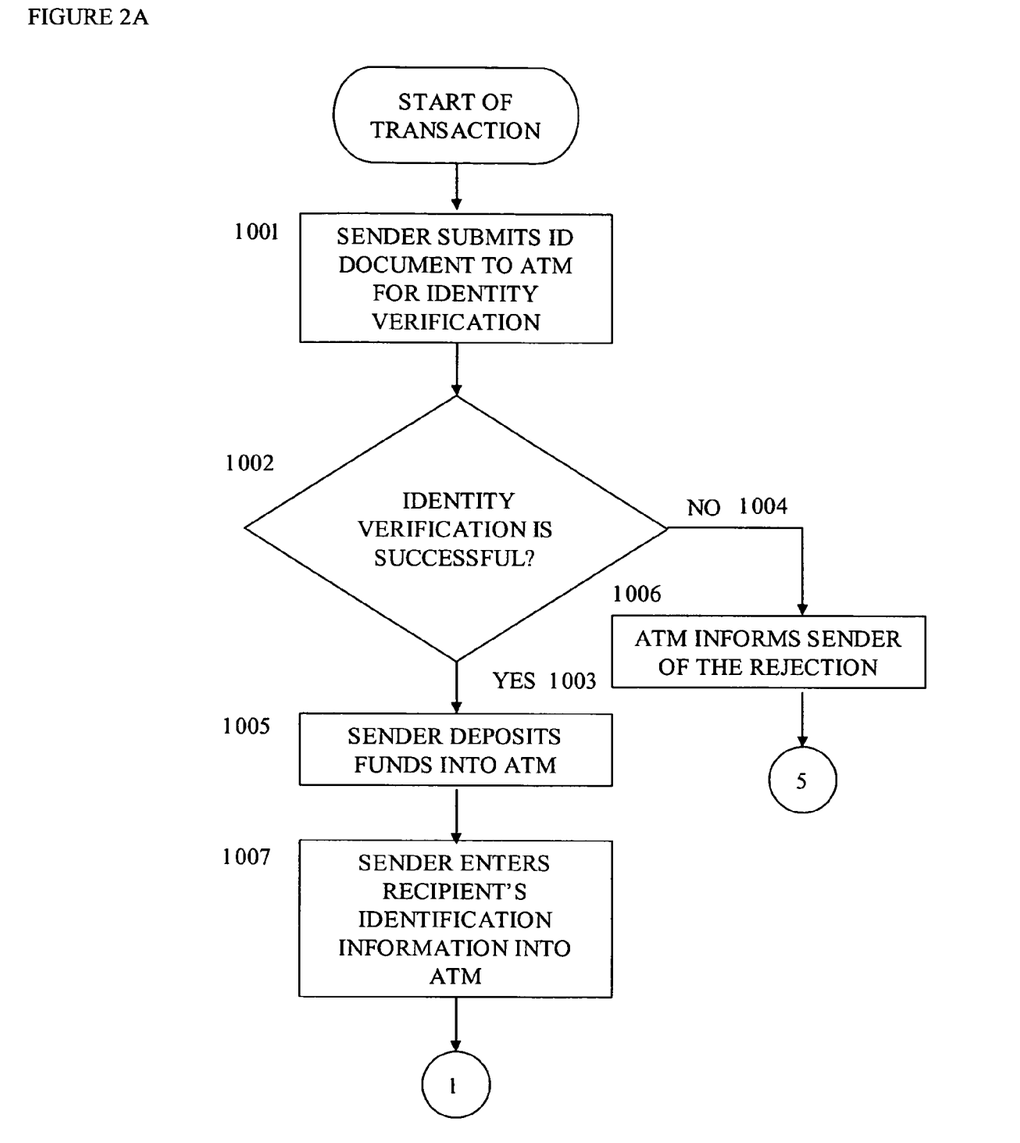
Figure 2B:
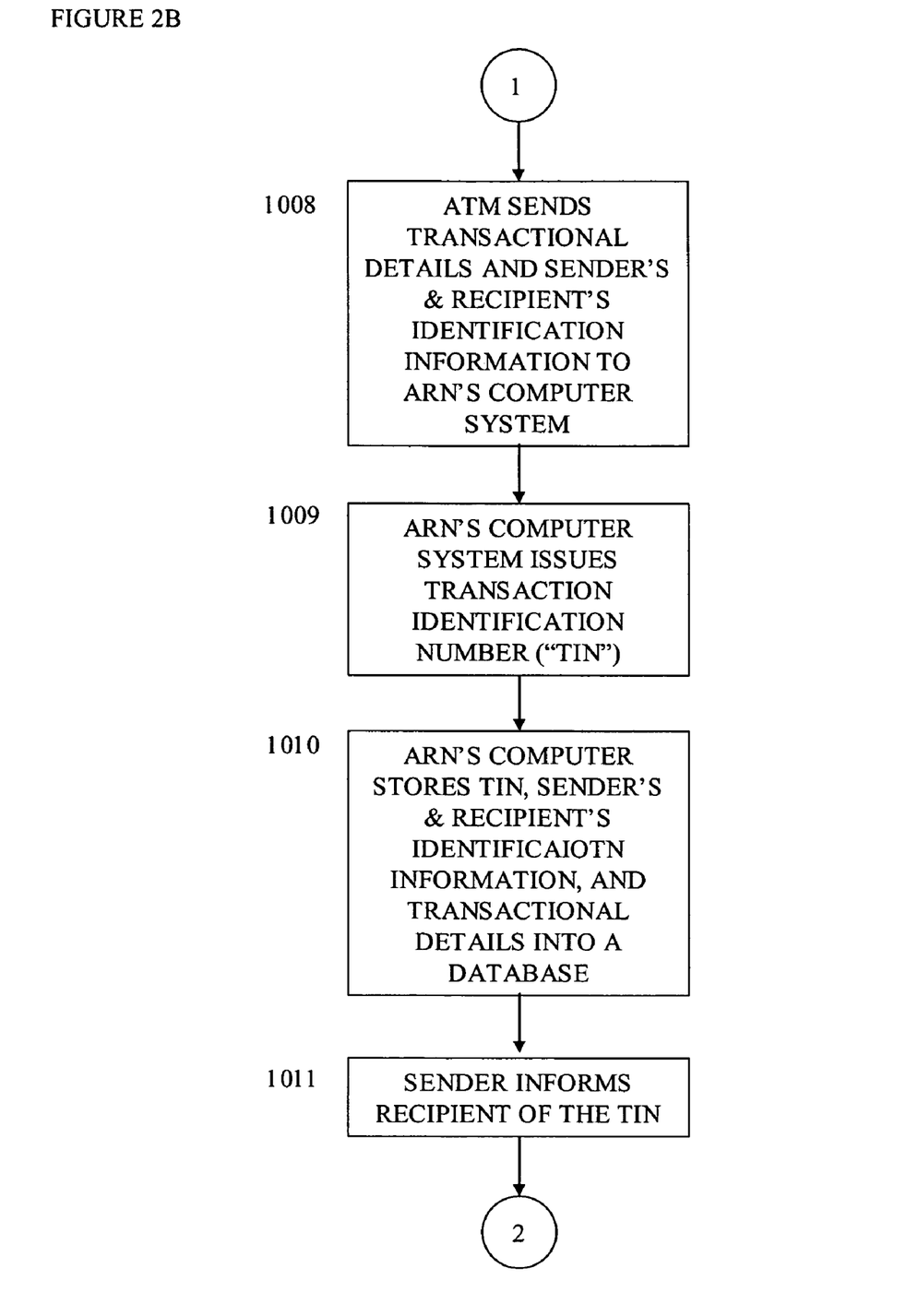
Figure 2C:
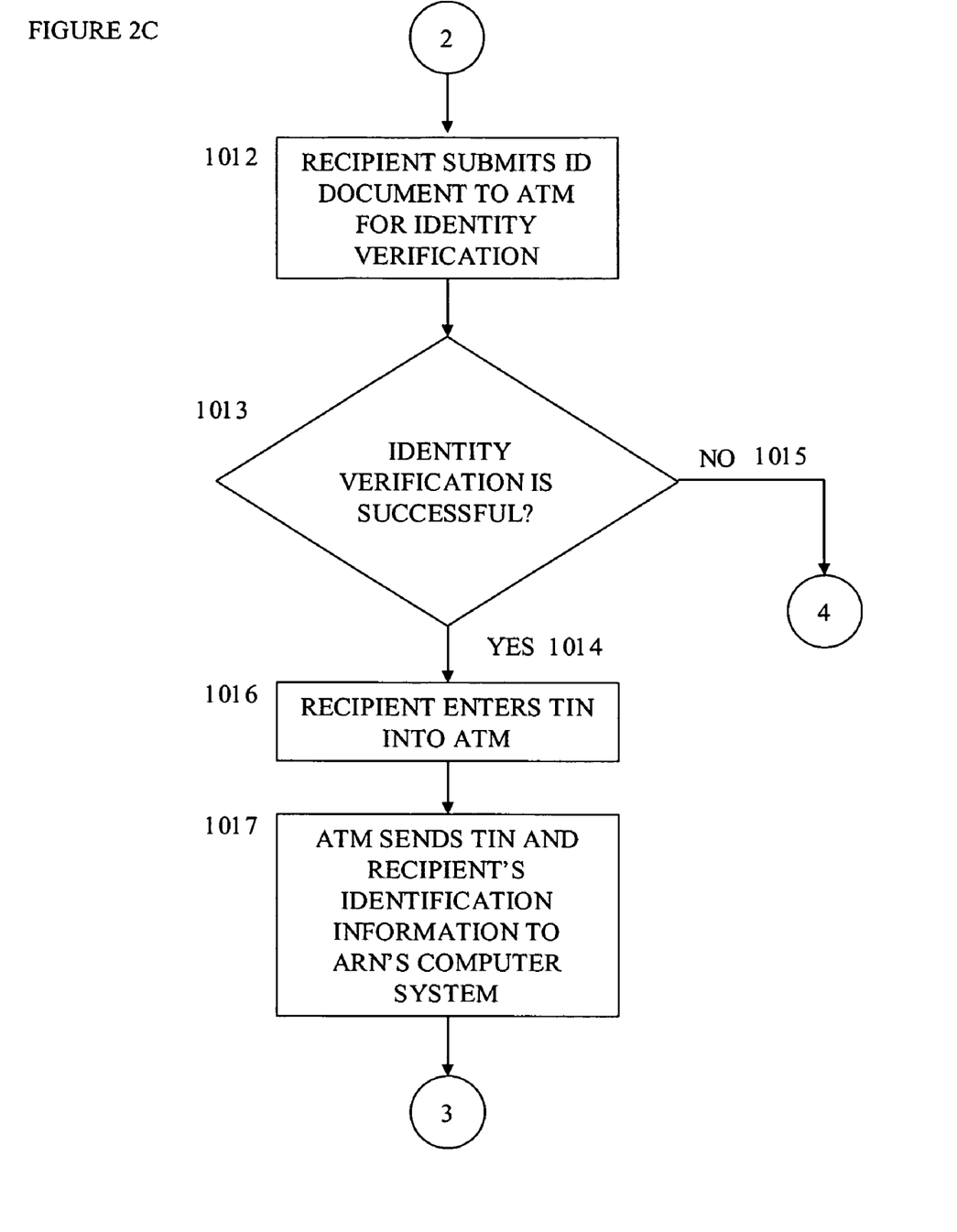
Figure 2D:
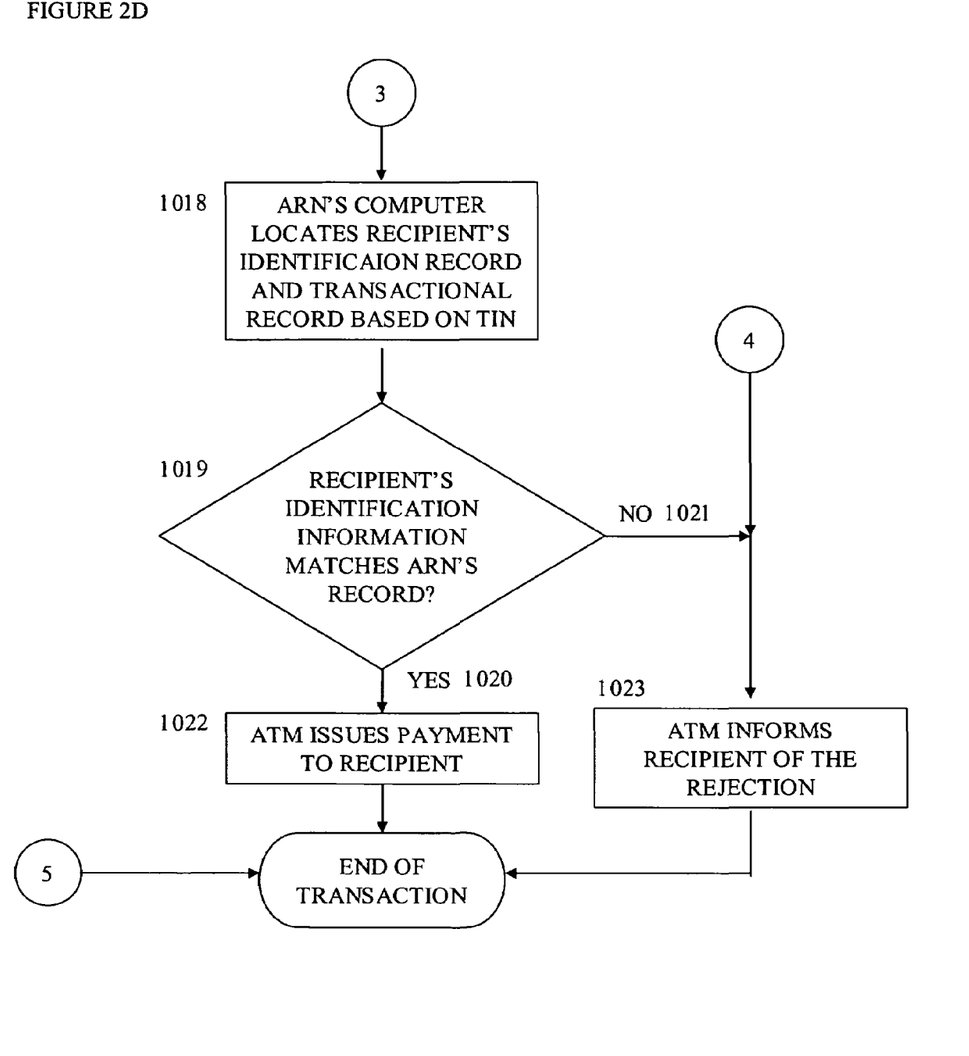

References should now be made to the flowchart of FIG. 2 in combination with the system diagram of FIG. 1, which together illustrate how the system enables a sender to send money to a recipient through the ARN.

First (block 1001), a sender 100 submits a passport or other official identification document to an ATM terminal 150, which can read the embedded identification information of the official identification document. The ATM terminal 150 also reads the personal identity information, such as a fingerprint, directly from the sender 100.

Then (decision block 1002), the ATM terminal 150 verifies the sender's personal identity information, such as a fingerprint, with the identification information embedded within the official identification document of the sender 100.

If the identity of the sender 100 cannot be verified (NO branch 1004), the ATM 150 informs the sender 100 of the rejection (block 1006). This action subsequently ends the transaction.

If the identity of the sender 100 is verified successfully (YES branch 1003), the sender 100 will deposit funds into the ATM terminal 150 (block 1005).

In addition (block 1007), the sender 100 enters the identification information of the recipient 200 into the ATM terminal 150.

After collecting the information from the sender (block 1008), the ATM 150 sends the transactional details, the sender's identification information and recipient's identification information to the computer system 300 of the ARN via a network 400.

Subsequently (block 1009), the computer system 300 of ARN issues a TIN to identify this specific transaction.

Furthermore (block 1010), the computer system 300 of ARN stores the TIN, the transactional details, the sender's identification information, and the recipient's identification information into a database.

For the recipient 200 to receive the funds, the sender 100 has to inform the recipient 200 of the TIN, which has the dual effects of transaction identification and security protection (block 1011).

After obtaining the TIN (block 1012), the recipient 200 submits his/her passport or other official identification document to the ATM terminal 250 for identity verification.

The ATM terminal 250 verifies the personal identity information of the recipient 200, such as a fingerprint, with the identification information embedded within the official identification document (decision block 1013).

If the ATM terminal 250 cannot verify the identity of the recipient 200 (NO branch 1015), the ATM terminal 250 informs the recipient 200 of the rejection and ends the transaction.

If the identity verification is successful (YES branch 1014), the recipient 200 can enter TIN into the ATM terminal 250 (block 1016).

After receiving the TIN (block 1017), the ATM terminal 250 sends TIN and recipient's identification information to the computer system 300 of ARN via a network 400.

Based on the TIN (block 1018), the computer system 300 of ARN locates the records of the transactional details and the recipient's identification information entered by the sender 100.

The computer system 300 of ARN verifies the recipient's identification information, which is read by the ATM terminal 250, with the recipient's identification information in the record, which is entered by the sender 100 (decision block 1019)

If it does not match (NO branch 1021), the ATM 250 informs the recipient 200 of the rejection (block 1023).

If it is a match (YES branch 1020), the ATM terminal 250 issues a payment to the recipient 200 based on the instruction given by the sender 100 (block 1022).

This remittance transaction is completed via the ATM terminals 150 and 250, which can be located anywhere around the world.

In this process, the transactional details and identification information of the sender 100 and the recipient 200 are collected in accordance with governments' regulations for the purposes of anti-money laundering, anti-terrorist financing, and anti-fraud.

This invention can be used by a group of financial institutions. A common computer system and database can handle all the remittance transactions for these financial institutions by sharing the same network of user-accessible terminals. Alternatively, each financial institution can have its own computer system and database to conduct all the remittance transactions originated from those user-accessible terminals, which are managed by the said financial institution.

By using a TIN that includes the identification information of the particular terminal, financial institution, shared computer system or other network node which has accepted the sender's funds, a network switch can route a recipient's request for payment to that particular node to complete the remittance transaction.

Even though the sender or recipient may not be associated with any account in any financial institution, by strictly requiring that the sender and recipient each use an official identification document, and by appropriate use of the information stored in those documents or instruments to complete the transaction in accordance with the present invention, it is thus possible for such a transaction to be fully complaint with the regulatory requirements of the Bank Secrecy Act, the USA PATRIOT Act and other equivalent laws.

Those skilled in the art will recognize that the described embodiments can be assembled in various ways to form a variety of applications based on the need, and that obvious alterations and changes in the described structure may be practiced without meaningfully departing from the principles, spirit and scope of this invention. Accordingly, such alterations and changes should not be construed as substantial deviations from the present invention as set forth in the appended claims.

The invention claimed is:

1. A method for performing a remittance transaction from a sender to a recipient through a computerized network of user-accessible terminals, comprising:

using a first terminal to read first embedded identification information from a first official identification document submitted by the sender, the first embedded identification information including an official identification document number, and either a country or state that issued the official identification document;

using said embedded first identification information to authenticate the identity of the sender;

collecting funds from the sender after the identity of the sender has been thus authenticated;

causing the sender to enter recipient identification information and other transactional details for said remittance transaction;

assigning a transaction identification number to said remittance transaction by a respective computer system, the transaction identification number incorporating an identification of the respective computer system;

storing the transaction identification number, the authenticated sender identity, the recipient identification information and the other transactional details, into a first transactional database of a first computer system;

performing anti-terrorist financing measures based upon the authenticated sender identity and the recipient identification information;

always requiring a claimant to use a second terminal to read second embedded identification information within a second official identification document submitted by the claimant, the second terminal being connected to a second computer system;

using said embedded second identification information to authenticate the identity of the claimant;

prompting the claimant to identify the previously assigned transaction identification number after the claimant's identity has been authenticated;

using the transaction identification number identified by the claimant to route a payment request from the second terminal to the first computer system to retrieve any recipient identification information and other transactional details associated with said identified identification number;

verifying that the second embedded identification information obtained from the claimant matches the retrieved recipient identification information associated with the identified transaction identification number; and if the embedded second identification information matches said retrieved recipient identification information, delivering funds to the claimant in accordance with the retrieved transactional details, whereby a sender and a recipient on different networks can complete a transaction using a transaction identification number that identifies the computer system responsible for the transaction initiated by the sender.

2. The method of claim 1 wherein at least the recipient does not have any financial account with any financial institution affiliated with said computerized network.

3. The method of claim 1 wherein at least the sender does not have any financial account with any financial institution affiliated with said computerized network.

4. The method of claim 1 further comprising:

using at least one network switch to connect a plurality of computerized networks of user-accessible terminals each including a respective computer system, wherein said first terminal is directly connected by a first said network to a first said computer system, and wherein said second terminal is directly connected by a second said network to a second said computer system;

incorporating into each said transaction identification number assigned by a respective said computer system an identification of the said respective computer system;

using the transaction identification number input by the claimant to route a payment request from the second terminal to the first computer system; and transferring funds in accordance with the stored transactional details from the first computer system to the second terminal, whereby a sender and a recipient on different networks can complete a transaction using a transaction identification number that identifies the computer system responsible for the transaction initiated by the sender.

5. The method of claim 4 wherein at least one of said networks is adapted to process remittance transactions between terminals directly connected to said one network.

6. The method of claim 4 wherein each said computer system is provided with a respective transactional database, further comprising: reconciling accounting records for a completed remittance transaction between said first computer system and said second computer system, and settling the payment between the two computer systems.

7. The method of claim 1 wherein:
at least some of said embedded identification information is read from a magnetic media.

8. The method of claim 1 wherein:
at least some of said embedded identification information is read from an electronic media.

9. The method of claim 1 wherein:
at least some of said embedded identification information is read from an electromagnetic media.

10. The method of claim 9 wherein:
the electromagnetic media includes at least radio frequency signals.

11. The method of claim 1 wherein:
at least some of the information used to authenticate the identity of the sender is embedded inside the sender's official identification document in a secure manner which guards against unauthorized alteration; and at least some of the information used to authenticate the identity of the claimant is embedded inside the claimant's official identification document in a secure manner which guards against unauthorized alteration.

12. The method of claim 11 wherein:
the embedded identification information used for authenticate the identity at least includes information selected from the group consisting essentially of passwords, tax identification numbers, private personal information, and biometric information.

13. The method of claim 12 wherein:
the biometric information includes information selected from the group consisting essentially of fingerprints, facial patterns, voice patterns, and iris patterns.

14. The method of claim 1 wherein:
at least some of the funds from the sender are collected using a payment instrument selected from the group consisting essentially of cash, credit cards, debit cards, stored-value cards, and combinations thereof.

15. The method of claim 1 wherein:
at least some of the funds from the sender are collected using an electronic funds transfer from a verified financial account.

16. The method of claim 1 wherein:
at least a portion of at least one said payment is delivered to the recipient using a payment instrument selected from the group consisting essentially of cash, credit cards, debit cards, stored-value cards, and combinations thereof.

17. The method of claim 1 wherein:
delivering the payment to the recipient is accomplished at least by means of an electronic funds transfer to a verified financial account.

18. The method of claim 1 wherein:
the computer system stores at least some identification information for both the sender and the recipient, and the stored identification information includes at least some information that is selected from the group consisting essentially of name, date of birth, address, tax ID, type of official identification document, official identification document number, country that issues the official identification document, state that issues the official identification document, and expiration date of the official identification document.

19. The method of claim 1 further comprising:
using a video camera to record the activities in the vicinity of at least said first or second terminal for the purposes of crime prevention.

20. The method of claim 1 wherein:
at least one of said first and second terminals is a user-accessible terminal that is integrated with a money-transactional terminal selected from the group consisting essentially of ATM terminals, check-cashing kiosks, parking lot payment kiosks, gas station payment kiosks, coin-exchange machines, and supermarket checkout stands.

21. The method of claim 1 wherein:
said computerized network is integrated with at least one existing computerized network of money-transactional terminals.

22. The method of claim 21 wherein:
at least some of said money-transactional terminals are selected from the group consisting essentially of ATM terminals, check-cashing kiosks, parking lot payment kiosks, gas station payment kiosks, coin-exchange machines, and supermarket checkout stands.

23. The method of claim 1 wherein:
at least one of said terminals is supervised by a human attendant.

24. The method of claim 1 further comprising:
performing anti-money laundering measures and the anti-terrorist financing measures based upon the other transactional details, the anti-money laundering and anti-terrorist financing measures being imposed by a government having jurisdiction over the sender.

25. The method of claim 1 further comprising:
performing anti-money laundering measures and the anti-terrorist financing measures based upon the other transactional details, the anti-money laundering and anti-terrorist financing measures being imposed by a government having jurisdiction over the recipient.

26. A computer readable medium tangibly storing a computer program for performing a remittance transaction from a sender to a recipient, comprising:
a first ID receiving terminal that receives first embedded identification information read from a first official identification document submitted by the sender, the first embedded identification information including an official identification document number, and either a country or state that issued the official identification document; that verifies the embedded first identification information to authenticate the identity of the sender and that instructs receipt of, funds from the sender after the identity of the sender has been thus authenticated;

a data code segment that receives recipient identification information and other transactional details for said remittance transaction; that assigns a transaction identification number to said remittance transaction by a respective computer system, the transaction identification number incorporating an identification of the respective computer system and that stores the transaction identification number, the verified sender identity information, the recipient identification information and the other transactional details, into a first transactional database of a first computer system; and an anti-terrorist financing code segment that performs anti-terrorist financing measures based upon the verified sender identity information and the recipient identification information;

a second ID receiving terminal that receives second embedded identification information from a second official identification document submitted by a claimant, the second terminal being connected to a second computer system;

a verifying code segment that uses said embedded second identification information to authenticate the identity of the claimant;

a claimant receiving code segment that receives from the claimant the previously assigned transaction identification number after the claimant's identity has been authenticated; and a confirming code segment that uses the transaction identification number identified by the claimant to route a payment request from the second terminal to the first computer system to retrieve any recipient identification information and other transactional details associated with said identified identification number, confirms that the second embedded identification information obtained from the claimant matches the retrieved recipient identification information associated with the identified transaction identification number; and if the embedded second identification information matches said retrieved recipient identification information, authorizes delivery of funds to the claimant in accordance with the retrieved transactional details, whereby a sender and a recipient on different networks can complete a transaction using a transaction identification number that identifies the computer system responsible for the transaction initiated by the sender.

* * * * *